Patented Oct. 15, 1940

2,217,711

UNITED STATES PATENT OFFICE 2,217,711

ANTIOXIDANTS

Sol Shappirio, Washington, D. C.

No Drawing. Application July 21, 1937, Serial No. 154,937. In Canada July 22, 1936

9 Claims. (Cl. 23—250)

This invention relates to antioxidants, but more particularly to chemical antioxidants, the antioxidants of the present invention being utilizable for the protection generally of substances subject to oxidative change, including both edible and inedible substances, but particularly valuable in the protection of edible materials.

In the prior art, both chemical antioxidants and antioxidants from natural vegetable materials have been suggested for use. The chemical antioxidants have been undesirable from the standpoint particularly of food products. The vegetable antioxidants either have required elaborate methods for segregation of such antioxidants from the vegetable materials, or if used in their naturally occurring state, as in vegetable materials, are usually present with pro-oxidant substances also present in such natural vegetable materials, the presence of such pro-oxidants militating against the value of the antioxidants present, whether extracts of the antioxidants are utilized or not. In addition, antioxidant substances present in natural vegetable or related materials, vary considerably in quantity and effect, and are not uniformly produced by plant substances, nor are the vegetable materials uniformly effective.

The present invention is concerned with antioxidants in the form of chemical entities or chemically synthesized products, obtainable in some few instances from natural materials, the antioxidants of the present invention having definite controllable antioxidant activity.

Further objects of the present invention include the production of novel types of antioxidants.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, the anti-oxidants may be either chemical entities or synthesized chemical entities built up synthetically, either from the individual components ultimately reacted together to give the complex organic derivatives of desired antioxidative value, or they may be formed by synthetically utilizing naturally occurring materials as a basis for one of the components, the synthetic antioxidants being produced directly in situ by synthesis from such naturally occurring materials.

Particularly useful as antioxidants in accordance with the present invention are bodies which may generally be classed together as hydroxyl-containing substances, including unsaturated aliphatic alcohols like vinyl and allyl alcohols, or the more complex unsaturated alcohols, such as the lipoid alcohols, including phytosterol, and cholesterol, the alkyl amines, particularly the alkylamino alcohols and the alkylamino acids, the esters of these various alcohols with organic and inorganic acids, and the esters and salts of the alkylamino derivatives. The unsaturated alcohols have particularly been emphasized and illustrated above, while exemplary of the alkylamino acids, the betaines may be mentioned. The latter are usually considered to be in the form of inner anhydrides, but their antioxidant activity is believed to be due to a combination of elements in the molecule, including the nitrogen group, and the unsaturated and alcohols groups present in the tautomeric form of the betaines. Betaine itself is, as pointed out below, the best example of this group of materials. The alcohols may be utilized in the form of their esters or other derivatives, such as the esters of both organic and inorganic acids, the various phosphoric acid derivatives being particularly important, and they will be utilized for exemplification purposes below. The various substances illustrated above, including the alkylamino acids, the alkylamino alcohols, the unsaturated alcohols, the lipoid alcohols, etc., may all be utilized directly as antioxidants, using, for example, a fraction of a percent of such antioxidant added to or contacted with the substance to be protected against oxidative change. Thus 0.5% of the indicated material may be added to a glyceride oil or fat to protect the latter against development of rancidity. Where the antioxidants, such as the betaines, include acid groups, the latter may be esterified with alcohols of various types to produce derivatives utilizable as antioxidants.

Among the alkylamino alcohols and alkylamino acids, the derivatives containing penta-valent nitrogen in the nature of derivatives of tri-alkyl-ammonium hydroxide are particularly useful illustrated by choline, namely hydroxy-ethyl-trimethyl-ammonium hydroxide, colamine, etc., while the analogous alkylamino acids illustrated by the betaines, exemplified by betaine specifically (oxy-neurine or lycine) $COOH.CH_2.N(CH_3)_3.OH$ their various homologues and derivatives may be employed.

The following specific example of one manner of the preparation of alkylamino-alkyl-phosphoric acid esters built up from their components, and utilizable as antioxidants is given:

23 parts of phosphorus pentoxide are stirred into a melt of 100 parts of distearin, and after a few minutes 54 parts of a choline salt, such as bicarbonate, are added, and the mixture stirred and kneaded until it solidifies. The resulting mixture contains the antioxidants, particularly in the form of a choline derivative of glycerol-phosphoric acid containing the stearic residues bound in the molecule. By such reactions, mixtures of materials are produced, and they are capable of direct use for antioxidative purposes in manners and ways illustrated below.

If desired to segregate the alkylamino-alkyl-phosphoric acid ester, the mixture as produced above may be treated with hot benzol, which dissolves the alkylamin-alkyl-phosphoric acid ester and leaves other derivatives, such as choline phosphate, substantially undissolved. The filtrate may be neutralized as by alcoholic alkali metal hydroxides, and the solution concentrated or allowed to crystallize out directly with cooling. Further purification may be carried out by means of benzol, if desired.

The examples given above may be varied in many different ways by transposing the order of the steps, for example, and permitting first the distearin and the choline derivative to react, etc. The amino-alcohol, such as the choline, is desirably employed in the form of a salt, either of an inorganic or an organic acid, such as the carbonate, bicarbonate, fatty acid salt, etc. Colamine, as noted may be substituted for choline, or other amino-alcohols may be utilized, such as ethanolamine and adrenaline, or other ammonium base, or an arsonium base may be employed. The diglycerides, such as distearin, may vary in character, and may be employed as such in the reaction, or diglycerides mixed with triglycerides or neutral fats may be employed.

Other methods of synthesizing analogous derivatives may be employed. Thus the phosporic acid ester of distearin may first be prepared, and choline then permitted to react therewith. Or a diglyceride-phosphoric acid may be permitted to be esterified with ethylene glycol or its chlorhydrin, and the resulting product or ester treated with trimethylamine.

Since choline and related compounds are widely distributed in animal and vegetable materials, such natural products containing choline may be utilized in lieu of the choline of the example given above to produce corresponding compounds directly in situ in the vegetable or animal materials, and the resulting products employed as antioxidants. Thus hops, which contain choline, may be subjected to treatment with the phosphoric acid ester of distearin, so that combination of the phosphoric acid ester of distearin with the choline or related compound in the natural material occurs. This is exemplary of the production of antioxidants directly in situ in natural occurring vegetable and animal products, with the utilization of the latter either for admixture with additional quantities of analogous vegetable or animal materials respectively, or for addition or use with other substances as antioxidants.

The various proteid substances may be directly subjected to treatment with any of the phosphoric acids, but particularly metaphosphoric acid, and more particularly by the utilization of glycerol-phosphoric acids for conversion into materials utilizable as antioxidants, or such glycerol phosphoric acid combinations thus produced may be further treated with choline or other amino-alcohols, as set forth above, for the production of still more complex materials utilizable as antioxidants. Any of the proteid materials, including the proteins, albumins, etc., such as casein, glue, gelatin, etc., may be employed. For example, casein may be treated with glycerol-phosphate, as for example, by suspending casein in 10% aqueous alcohol, and adding glycerol-phosphate of sodium thereto in the proportion of 10 cc. of the glycerol-phosphate to each gram of casein. Gluten of wheat or zein of corn may be similarly treated. The combinations may be heated gently to produce the desired products, and water subsequently removed as by means of strong alcohols. The products may be evaporated in vacuo at low temperatures, such as 40° C., or may be precipitated from the medium by means of alcohols. Instead of glycerol-phosphate, the fatty acid-glycerin-phosphoric acids, such as the palmityl, oleyl, and stearyl glycerin-phosphoric acids may be employed. For example, 95 parts of casein are treated with 10 parts of 50% disodium-distearyl-glycerin-phosphate in suspension in aqueous or alcoholic liquids, and the product dried at low temperatures, preferably in vacuo.

Such glycerol-phosphoric acid derivatives obtained by direct reaction with various proteid substances, either substantially pure proteins and albumins, such as casein, or natural products containing substantial amounts of such materials, obtained in the manner set forth above, may be further treated with choline or other amino-alcohols to produce antioxidants.

Instead of producing a distearin or other diglyceride by synthetic methods as set forth above in the specific example for the formation of the alkyl-amino-alkyl-phosphoric acid esters, a natural oil or fat, or oil or fat-containing product, may be utilized. Such natural oil or fat may be subjected to alcoholysis to produce a diglyceride, or mixtures containing diglycerides, may be employed in the manner set forth in the specific example given above for reaction with phosphorus pentoxide and choline to produce the corresponding alkylamino-alkyl-phosphoric acid esters. Alcoholysis is well known, and may be employed in the usual way by treating an oil, for example, with a polyhydric alcohol, heating the mixture at elevated temperatures to give the desired diglycerides. Thus an ordinary bland oil of saturated character, and containing substantially triglycerides only, is heated with glycerol, a glycol, etc., glycerol being preferred in the present instance. ½ of a mol of glycerol may be used to 1 mol of triglycerides, and the mixture heated, for example, for several hours at elevated temperatures, as, for example, about 200° C. until alcoholysis is completed. While bland oils have been specifically mentioned above, any of the edible oils may be thus treated, and inedible oils, such as the drying oils or semi-drying oils, may also be subjected to alcoholysis. Linseed oil, for example, may be heated with glycerol, 282 parts of linseed oil being heated with 92 parts of glycerol for 3 hours at 170–18° C., desirably an inert gas like carbon dioxide gas being passed through the reaction mixture during the heat treatment. Alcoholysis is substantially complete at the end of that period. Catalysts, such as calcium glycerate or glycolate may be utilized during the alcoholysis reaction. The diglycerides or mixtures containing them may then be subjected to the steps given in the specific example above for the production of the phosphoric acid esters.

An advantage of the method of producing such diglycerides by alcoholysis of an oil is the fact that the antioxidants can be built up in the oil itself in part from the constituents of the oil. The entire oil may be converted into the diglyceride and utilized for the production of the alkyl-amino-alkyl phosphoric acid esters in accordance with the specific example given above, and the resulting alkylamino-alkyl phosphoric acid ester then added either to the same or a different oil or fat in limited quantity in order to protect the latter against oxidation, or the oil which is to be given antioxidant properties, may be converted only in part into a diglyceride, the latter remaining distributed through the bulk of triglyceride which remains unchanged, and such diglyceride-containing oil then subjected to the production of the alkylamino-alkyl-phosphoric acid ester to produce the latter distributed through the main body of the unchanged oil, whereupon the antioxidant is produced in situ in the oil. Refined oils may particularly be treated in this way to give them antioxidant properties and resistance to development of rancidity.

Another manner of treating the oil to produce the antioxidants in situ therein is to employ oils containing some acids, such as rancid oils, or oils which have been partially hydrolyzed to produce acids therein, so that the oils or fat contain acids of the same character as those present as esters in the oils. Such acid-containing oils may then be treated with any of the alcoholic bodies, such as the unsaturated alcohols, the alkylamino alcohols, the lipoid alcohols, etc. to produce esters of the acids present in the oils with such alcohol bodies. The usual types of esterification reactions are available for use in this connection. For example, a rancid oil may have choline or phytosterol added thereto in the proportion of 1 mol of the free acids of the oil to 1 mol of the alcohol, and the resulting mixture then heated to temperatures of about 105° C. for several hours in order to produce the esters. Esterification catalysts may, of course, be employed if desired to accelerate the reaction, and an inert gas like nitrogen may be blown through the reaction mixture during the heating in order to remove water. Or a further procedure is to take such acid-containing oil and esterify the acid present therein with an excess of polyhydric alcohol, so that the ester produced is either a mono or di-ester of the polyhydric alcohol. To illustrate the proportions that may be utilized for this purpose, to an acid-containing oil there may be added glycerol in the ratio of 1 mol of glycerol to 2 mols of the acid present in the oil, followed by esterification to produce a di-acyl of glycerine. This material present in the oil itself may then be converted into the glycerol-phosphoric acid combination as illustrated above, by treatment with phosphorus pentoxide. The glycerol-phosphoric acid esters of the acid present in the oil may be utilized as the antioxidant, or may be subjected to further treatment, as indicated above, as for example by treatment with one of the alcohols, such as choline, or an unsaturated alcohol, or a lipoid alcohol, such as phytosterol, or any of the amino-alcohols, in order to produce further more complex bodies having pronounced antioxidative activity.

In lieu of the alkylamino-alcohols, the alkylamino acids, as illustrated by betaine, referred to above, may similarly be employed. The betaines may be directly employed as antioxidants. Betaine itself is available as a by-product from beet sugar manufacture, betaine being found extensively in sugar beets, and also in other vegetable products, and in animal products, such as shell fish. It may be readily produced synthetically by oxidizing choline, and in other ways. Its ready availability in the residues from beet sugar manufacture, such as in the so-called "melasse" gives a ready source for its derivation. Other natural occurring betaines, such as trigonelline, obtained from the seeds of fenugreek, may similarly be employed, and the melasse or other sugar beet residues containing the betaine or the seeds of fenugreek may be employed as antioxidants utilizing the desired materials in powdered condition, or in suspension, in contact with the substances to be protected against oxidation, particularly as further pointed out below.

Instead of utilizing the betaines represented by betaine directly as an antioxidant, the betaines may be utilized for the production of alkylamino-alkyl-phosphoric acid esters analogous to those obtained from choline substituting, for example, approximately 45 parts of betaine for the 54 parts of choline bicarbonate in the specific example given above. The resulting product is an alkylamino-alkyl-phosphoric acid ester that can be utilized for antioxidant purposes. The melasse may be treated directly with the distearyl-phosphoric acid ester, or other phosphoric acid ester of a diglyceride to produce corresponding antioxidants.

Since the betaines are acid bodies, they may be utilized for production of esters by reaction with alcohols, particularly the unsaturated alcohols, and also the amino-alcohols, as well as the lipoid alcohols, like phytosterol, for the production of esters utilizable as antioxidants.

The antioxidants of the present invention including the betaines and the alkylamino-alkyl-phosphoric acid esters, etc. may be employed for the protection of a wide variety of materials against oxidation. They may be added in limited proportions, such as only a fraction of a per cent to oils or fats to protect the latter against oxidation, or they may be dusted on food products to produce a dusted-on coating protecting the latter against development of rancidity, or undesirable change in the oils or fats contained in such edible products. Or packaging materials carrying the stated antioxidants may be produced, such as paper carrying a sizing coating including the stated synthetic antioxidants, and such packaging materials employed as a wrapper for the products to be protected against development of rancidity.

The alkylamino-alkyl phosphoric acid esters produced as illustrated in the specific example given above may be formulated as follows, where glycerol is the polyhydric alcohol used (as in the case of the distearin of that example):

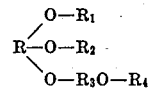

wherein I is the glycerol residue, $R_1$ and $R_2$ are the stearic acid residues $(.COC_{17}H_{35})$, $R_3$ is the phosphoric acid residue $(O.PO.OH)$, and $R_4$ is the choline residue $(CH_2.CH_2.N(OH)(CH_3)_3)$. $R_1$ and $R_2$ may be any monobasic carboxylic acid (acyl) residues, saturated or unsaturated, the higher fatty acids like stearic, palmitic, and oleic being preferred, and while in the example $R_1$ and $R_2$ are the same acyl groups, they may be the same or different. While $R_3$ is the phosphoric acid residue, it may be substituted by any polybasic acid, either organic or inorganic, such as phthalic, maleic, malic, sulphuric or other sulphur acid, arsenic acid, etc. $R_4$ representing the choline residue may be substituted by any other amino-alcohol, such as colamine, adrenaline, etc. $R_1$ and $R_2$ may likewise be betaines.

While R is given as the glycerol residue, it may be substituted by other polyhydric alcohols, such as polyglycerols, including di and triglycerols, the glycols, such as ethylene and propylene glycol, the polyglycols, the ethers of the glycerols or polyglycerols, mannitol, etc. The glycol derivatives are particularly important and lead to novel antioxidant materials. Thus if in lieu of the distearin of the specific example, there is used about 50 parts of the mono-stearic ester of ethylene glycol, there is formed the stearyl glycol-phosphoric acid ester of choline, representative of compounds formulated as

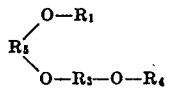

$R_5$ being the glycol residue, while $R_1$, $R_3$ and $R_4$ have the significance indicated above, for the glycero derivatives.

Analogously other polyhydric alcohols may be employed to produce alcoho-phosphoric acid esters. Further while the alkylamino derivatives, like choline, have been emphasized, since they are readily available, the alkyl groups of such hydroxyalkyl-trialkyl-ammonium compounds may be replaced by other carbon radicles, both aliphatic and aromatic with the latter as aryl groups, either with or without side chains.

Further, if in producing the desired antioxidants in situ from natural glycerides, such as the edible oils, wherein as explained above, alcoholysis is used to form in the oil a glyceride having a free hydroxyl (as, for example, distearin), a polyhydric alcohol different from glycerol is employed, as for example, a glycol, mixed polyhydric alcohol esters are produced leading to complex mixtures of the ultimate alkylamino-alkyl compounds, which mixtures, however, without segregation can be utilized for antioxidant purposes.

If now a natural oil-containing proteid material including any of the oil-containing seeds, nuts and fruits, such as cottonseed, sesame seed, etc., etc. is subjected to pressing to liberate the oil, but without segregation of the oil from the protein material of the cell walls, etc., the mixture is subjected first to alcoholysis to produce a polyhydric alcohol ester having a free hydroxyl group, and such mixture is treated with phosphorus pentoxide as in the given example, followed by the addition of choline, for example, antioxidants are obtained containing the phosphoric acid esters of the protein, as well as the glyceride residues.

Unless separation is used to segregate the individual components, the synthetic methods of producing antioxidants as herein set forth lead to complex mixtures, which mixtures may be used directly as antioxidants without segregation of particular components therefrom, unless the latter are individually desired. Thus where the alkylamino-alkyl-phosphoric acid esters are produced, other derivatives are formed at the same time, for example, amino-alkyl phosphoric acid esters. The latter may be left in the reaction mixture for their own antioxidative effects.

In use, these antioxidants may be contacted in any desired way with the substances to be protected. Oils and fats, oil and fat containing products, solids and liquids of various types, edible and inedible products, meats, flesh products, hydrocarbon oils and waxes, coffee, paint oils, gums and resins, etc. are exemplary of products that can be treated for protection. For edible substances, antioxidants of innocuous character should be chosen. For liquids the antioxidants may be dissolved or suspended therein or coated on containers. For solids, the antioxidants may be admixed with the product, or dusted thereon, or applied as a coating or sizing on the container or the materials from which the container is made, or to wrapping materials.

It should be kept in mind in connection with the present invention that when the alkylamino-alkyl phosphoric acid esters or related materials are produced in situ, particularly by the treatment of natural materials, that individual compounds are not generally obtained, but complex mixtures of closely related derivatives are produced. However, such complex mixtures of derivatives are all utilizable as antioxidants without segregation of individual components or compounds therefrom.

The lipoid alcohols, as noted, may be used as such or in the form of their compounds. Thus a small amount of lanolin may be added to a fat or oil using say 1% of the former based on the weight of the latter to protect it against rancidity. Since animal blood contains a lipoid alcohol compound, it may be added to meats to protect the latter; preferably in this instance the same blood recovered from the animal whose meat is to be protected is employed. Or synthetic esters of the lipoid alcohols can be used. Thus phytoseterol may be converted into inorganic or organic esters, as with any of the phosphoric acids to produce an ester having antioxidant value. Such synthetic esters may be produced in situ by treating substances containing such lipoid alcohols or their compounds, as phytosterol, with an acid such as phosphoric acid, to produce the ester in situ. Where the acid used is polybasic as in the case of phosphoric acid, another of the hydroxyl groups of the acid can be esterified as with glycerol, while still, if desired, retaining acid properties in the molecule. Thus glycerophosphoric acids of phytosterol etc. may be produced. All such derivatives may be used as antioxidants in the manner set forth above.

Having thus set forth my invention, I claim:

1. An organic substance subject to oxidative change in contact with a small amount of betaine as antioxidant.

2. A substance subject to oxidative change in contact with an antioxidant selected from the group consisting of the betaines, and the esters and salts of the betaines.

3. A substance subject to oxidative change in contact with an ester of betaine.

4. A substance subject to oxidative change in contact with an acylglycerol-phosphoric acid ester of a betaine.

5. The method of protecting a substance subject to oxidative change which comprises contacting said substance with a fraction of a per cent of an antioxidant selected from the group consisting of the betaines, and the esters and salts of the betaines.

6. A substance subject to oxidative change in contact with a synthetic phosphoric acid ester of a betaine as an antioxidant.

7. A substance subject to oxidative change in contact with a synthetic glycerol-phosphoric acid ester of a betaine as an antioxidant.

8. A substance subject to oxidative change in contact with a synthetic acyl-glycerophosphoric acid ester of a betaine as an antioxidant.

9. A substance subject to oxidative change in contact with a glycol-phosphoric acid ester of a betaine as an antioxidant.

SOL SHAPPIRIO.